(12) United States Patent
Heizmann et al.

(10) Patent No.: US 8,930,275 B2
(45) Date of Patent: Jan. 6, 2015

(54) APPARATUSES, METHODS AND SYSTEMS FOR PROVIDING A VIRTUAL DEVELOPMENT AND DEPLOYMENT ENVIRONMENT INCLUDING REAL AND SYNTHETIC DATA

(76) Inventors: Robin Heizmann, Aarau (CH); Toni Farruggia, Horgen (CH)

(*) Notice: Subject to any disclaimer, the term of this patent is extended or adjusted under 35 U.S.C. 154(b) by 742 days.

(21) Appl. No.: 12/555,791

(22) Filed: Sep. 8, 2009

(65) Prior Publication Data
US 2010/0192220 A1    Jul. 29, 2010

Related U.S. Application Data

(60) Provisional application No. 61/095,009, filed on Sep. 8, 2008.

(51) Int. Cl.
| | | |
|---|---|---|
| *G06F 7/00* | (2006.01) | |
| *G06F 11/36* | (2006.01) | |
| *G06F 21/62* | (2013.01) | |
| *G06F 17/30* | (2006.01) | |

(52) U.S. Cl.
CPC ...... *G06F 11/3688* (2013.01); *G06F 17/30592* (2013.01); *G06F 17/30604* (2013.01); *G06F 17/30595* (2013.01); *G06F 11/3664* (2013.01); *G06F 21/6254* (2013.01)
USPC ............. 705/50; 707/602; 707/616; 707/669; 707/687; 707/708; 707/714

(58) Field of Classification Search
CPC .................... G06F 17/30592; G06F 17/30595; G06F 17/30604
USPC ........... 705/50; 707/602, 616, 669, 687, 708, 707/714
See application file for complete search history.

(56) References Cited

U.S. PATENT DOCUMENTS

| | | | | |
|---|---|---|---|---|
| 5,021,997 | A | * | 6/1991 | Archie et al. .................... 714/31 |
| 6,032,159 | A | * | 2/2000 | Rivlin .................................. 1/1 |
| 6,633,878 | B1 | * | 10/2003 | Underwood ........................... 1/1 |
| 6,907,546 | B1 | | 6/2005 | Haswell et al. |
| 7,100,195 | B1 | * | 8/2006 | Underwood ....................... 726/2 |
| 7,337,176 | B1 | * | 2/2008 | Cheedella et al. ..................... 1/1 |
| 7,523,023 | B1 | * | 4/2009 | Koh et al. ........................... 703/2 |
| 8,141,029 | B2 | * | 3/2012 | Russell ......................... 717/100 |
| 2003/0018699 | A1 | * | 1/2003 | Matthews et al. ............. 709/201 |
| 2003/0046029 | A1 | * | 3/2003 | Wiener et al. ................. 702/186 |
| 2003/0220927 | A1 | * | 11/2003 | Iverson et al. ................. 707/100 |
| 2004/0060035 | A1 | * | 3/2004 | Ustaris .......................... 717/100 |

(Continued)

OTHER PUBLICATIONS

Alexander Karmanov, Deploying Database Developments, Simple-Talk website, Jun. 17, 2008, all pages. http://www.simple-talk.com/sql/database-administration/deploying-database-developments/.*

(Continued)

*Primary Examiner* — Calvin Cheung
(74) *Attorney, Agent, or Firm* — Chadbourne & Parke LLP; Kenneth L. Johnson

(57) ABSTRACT

The APPARATUSES, METHODS AND SYSTEMS FOR PROVIDING A VIRTUAL DEVELOPMENT AND DEPLOYMENT ENVIRONMENT INCLUDING REAL AND SYNTHETIC DATA ("SYNONYM") provides a development and test environment with reduced database storage requirements that uses synthetic data based on anonymized real data. SYNONYM allows the use of sensitive data for testing while protecting such data as required by privacy laws, secrecy laws and company policies.

9 Claims, 17 Drawing Sheets

(56) References Cited

U.S. PATENT DOCUMENTS

| | | | |
|---|---|---|---|
| 2005/0015675 A1* | 1/2005 | Kolawa et al. | 714/38 |
| 2005/0086250 A1* | 4/2005 | Richardson | 707/102 |
| 2005/0086457 A1* | 4/2005 | Hohman | 713/1 |
| 2005/0193269 A1* | 9/2005 | Haswell et al. | 714/38 |
| 2005/0198074 A1* | 9/2005 | Khayter et al. | 707/104.1 |
| 2005/0283667 A1* | 12/2005 | Batten et al. | 714/25 |
| 2006/0015839 A1* | 1/2006 | Owens et al. | 717/100 |
| 2006/0080554 A1* | 4/2006 | McDonald et al. | 713/189 |
| 2006/0230083 A1* | 10/2006 | Allyn et al. | 707/204 |
| 2006/0248511 A1* | 11/2006 | Sanjar et al. | 717/124 |
| 2007/0006041 A1* | 1/2007 | Brunswig et al. | 714/38 |
| 2007/0112834 A1* | 5/2007 | Farr et al. | 707/102 |
| 2007/0266165 A1* | 11/2007 | Li | 709/230 |
| 2008/0065993 A1* | 3/2008 | Huang | 715/745 |
| 2008/0077605 A1* | 3/2008 | Vasu | 707/101 |
| 2008/0098003 A1* | 4/2008 | Dias et al. | 707/10 |
| 2008/0114801 A1* | 5/2008 | Singh | 707/102 |
| 2008/0168135 A1 | 7/2008 | Redlich et al. | |
| 2008/0201227 A1* | 8/2008 | Bakewell et al. | 705/14 |
| 2009/0172655 A1* | 7/2009 | Ivanov | 717/173 |
| 2009/0282042 A1* | 11/2009 | Russell et al. | 707/8 |

OTHER PUBLICATIONS

The Authoritative Dictionary of IEEE Standards Terms, 7th Ed., IEEE, Inc., New York, NY, Dec. 2000.*

"Defintion: instantiation", Whatis.com, all pages, date unknown.*

Merriam-Webster's Collegiate Dictionary, 10th Ed., all pages, 1993.*

"Synthesize" Merriam-Webster Dictionary website, all pages, date unknown, retrieved from http://www.merriam-webster.com/dictionary/synthesize.*

"Running Repository Creation Utility from the Command Line", all pages, Oracle website, date unknown, retrieved from http://docs.oracle.com/cd/E17904_01/doc.1111/e14259/rcu_silent.htm.*

Oracle® Database Day Developer's Guide 11g Release 1 (11.1) B28843-04, all pages, Oracle website, Mar. 2008, retrieved from http://docs.oracle.com/cd/B28359_01/appdev.111/b28843.pdf.*

International Search Report and Written Opinion of the International Searching Authority, issued Dec. 14, 2009, for PCT International Application No. PCT/US2009/56278, filed Sep. 8, 2009.

Written Opinion of the International Property Office of Singapore (prepared by the Hungarian Intellectual Property Office), dated Nov. 14, 2012, for Singapore Patent Application No. 201101645-8, filed Sep. 8, 2009.

Examination Report of the International Property Office of Singapore (prepared by the Hungarian Intellectual Property Office), issued Jul. 2, 2013, for Singapore Patent Application No. 201101645-8, filed Sep. 8, 2009.

* cited by examiner

FIGURE 1C

| | | |
|---|---|---|
| User Name: | Toni | 181 |
| User ID: | U1234 | 182 |
| Environments: | Mainframe / Environment 2 / Environment 3 / Environment 4 / Environment 5 | 183 |
| Project Name: | New_Application | 184 |
| Project ID: | P5678 | 185 |
| Applications: | Microsoft Visio / Eclipse / Microsoft Project / Novell / Microsoft Visual Studio | 186 |
| Databases: | ⦿ View Common  ○ View All  ☑ SYN_CUSTOMERS  ☑ SYN_ACCOUNTS  ☑ SYN_DEPOSITS | 187 |

[Submit]

FIGURE 2B

ANONYMIZATION RULES

| | |
|---|---|
| Names | Replace from a reference table comprising 676 female and 676 male names, using names common in the region (economicSector) indicated in the CIF. |
| Last Names | Replace from a reference table comprising 17,576 last names (different lengths, umlaute, double barreled), using last names common in the region (economicSector) indicated in the CIF. |
| Company names | Replace with company names made up of branch, consecutive number and the check digit from the CIF. |
| Addresses | Replace from tables with 900 syntactically correct postal addresses using addresses from the same region (zip code, town, street, house number, other). 30 to 100 addresses are used for foreign addresses. |
| Phone & fax numbers | Real area codes are used, the remaining digits are randomly generated. |
| Dates | Birth, death, incorporation dates: new randomly generated date in the same year conforming to any product specific age limit. |
| Identification Numbers | Social security or employee person identification number (PID): new randomly generated number of the same length. |
| Free text | Replaced with a character string of the same length. |

US 8,930,275 B2

APPARATUSES, METHODS AND SYSTEMS FOR PROVIDING A VIRTUAL DEVELOPMENT AND DEPLOYMENT ENVIRONMENT INCLUDING REAL AND SYNTHETIC DATA

RELATED APPLICATIONS

The instant application describes inventive aspects of at least two distinct implementations, including:

a method for providing a virtual development and/or test environment (with a suggested Class/Subclass of 726/26);

a method for data synthesization (with a suggested Class/Subclass of 703/22);

The instant application directs claims to Prevention Of Unauthorized Use Of Data Including Prevention Of Piracy, Privacy Violations, Or Unauthorized Data Modification (suggested class/subclass: 726/26). However, in order to develop a reader's understanding of the descriptions of the other implementations, the implementations have been compiled into a single application to illustrate and clarify how aspects of these implementations operate independently, interoperate as between individual embodiments, and/or cooperate collectively. The application goes on to further describe the inter-relations and synergies as between any of the various implementations within the context of an overarching inventive system; all of which is to further ensure compliance with 35 U.S.C. §112.

Furthermore, applicants hereby claim priority under 35 USC §119 for U.S. provisional patent application Ser. No. 61/095,009 filed Sep. 8, 2008 entitled "SYSTEM AND METHOD FOR PROVIDING A VIRTUAL BANKING ENVIRONMENT INCLUDING SYNTHETIC DATA."

The entire contents of the aforementioned application are herein expressly incorporated by reference.

FIELD

The present invention is directed generally to apparatuses, methods, and systems of computer testing, and more particularly, to APPARATUSES, METHODS AND SYSTEMS FOR PROVIDING A VIRTUAL DEVELOPMENT AND DEPLOYMENT ENVIRONMENT INCLUDING REAL AND SYNTHETIC DATA.

BACKGROUND

Software testing is utilized by software developers to reduce programming errors in software applications. Integrated development environments (IDEs), such as Microsoft Visual Studio and Eclipse, and the debuggers included with such IDEs are one set of tools that may be used by software developers for software testing.

SUMMARY

The APPARATUSES, METHODS AND SYSTEMS FOR PROVIDING A VIRTUAL DEVELOPMENT AND DEPLOYMENT ENVIRONMENT INCLUDING REAL AND SYNTHETIC DATA (hereinafter "SYNONYM") provides a virtual development and deployment environment. In one embodiment, a method involves receiving request to create synthesized testing data. Real data records to be anonymized are identified and a source of conjured data for anonymization of real data records based on a unique identifier in the real data records is selected. The method involves creating an anonymized data set by replacing real data in the real data records, based on the unique identifier in the real data records, with the selected conjured data, and selecting a subset of the anonymized data set based on specified criteria for synthesization. The method further involves generating a synthetic database, wherein generation further includes: instantiating a shell synthetic database, populating the shell synthetic data by copying the selected subset of the anonymized data set into the shell synthetic database, generating synthetic unique identifiers, and replacing unique identifiers with synthetic unique identifiers, and instantiating the synthetic database.

BRIEF DESCRIPTION OF THE DRAWINGS

The accompanying appendices and/or drawings illustrate various non-limiting, example, inventive aspects in accordance with the present disclosure:

FIG. 1C is of screen shot diagram illustrating a web based user interface in one embodiment of the SYNONYM;

FIG. 2B is a table illustrating anonymization rules in one embodiment of the SYNONYM;

The leading number of each reference number within the drawings indicates the figure in which that reference number is introduced and/or detailed. As such, a detailed discussion of reference number 105 would be found and/or introduced in FIG. 1. Reference number 205 is introduced in FIG. 2, etc.

DETAILED DESCRIPTION

Overview

As software applications have grown in size and complexity, testing of software applications has become increasingly more important. Having numerous components, including multiple database components, in large software applications exponentially increases the number of interactions that may happen among application components. Therefore, testing procedures should be used to check how changes in one application component affect other application components so as to prevent programming errors and inefficient implementations from being introduced into software applications as a result of changes to existing components or additions of new components. The amount and types of data used in software applications has also increased. As the number of users and options available to those users increases, the number of special cases, exceptions and languages supported by a software application also grows. Thus, the interactions between application components, including database components, and application data should also be tested to prevent errors. As the amount of testing that should be done increases, so does the cost, the length of time, and/or the number of people necessary to perform such testing. Some companies choose to outsource or offshore certain aspects of testing to reduce the cost associated with testing. However, outsourcing or offshoring testing creates another set of challenges as customer data useful in testing must be protected as required by various privacy laws and company policy. The synthetic deployment environment includes applications allowing mirroring by duplicating current environments, load balancing of current systems by deploying a number of synthetic environments adding additional capacity, generating synthetic gaming deployment environments, generating synthetic educational deployment environments, generating synthetic training deployment environment, generating synthetic medical deployment environments, fostering quality improvement by allowing environmental variations for testing that does not affect production environments.

SYNONYM

Figure 1A:
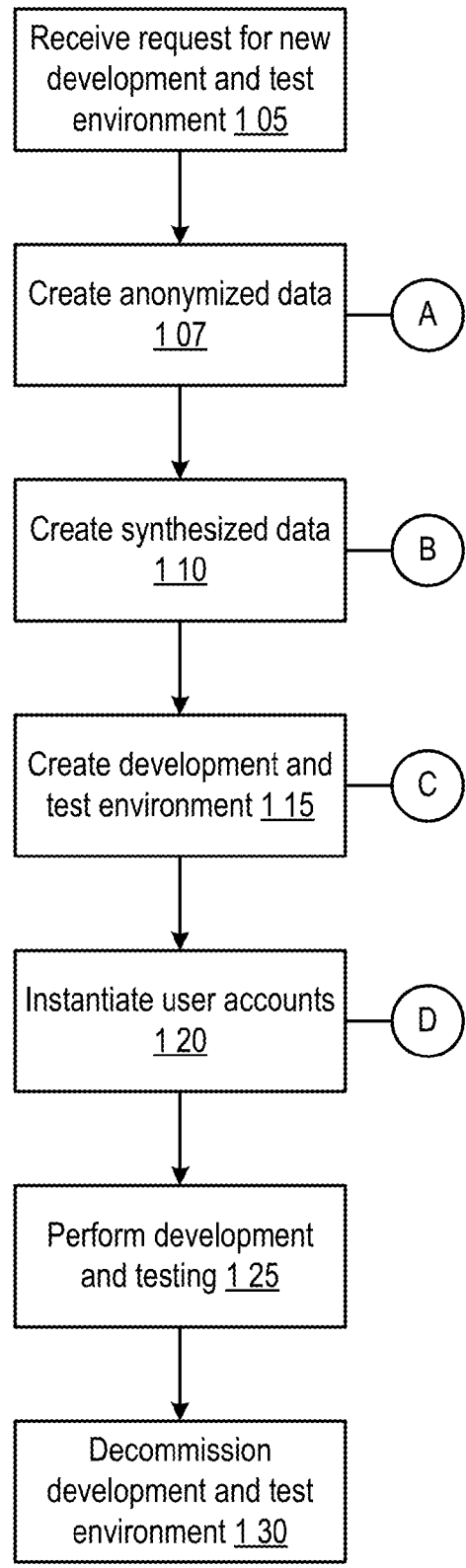
FIG. 1A is of a block diagram illustrating the creation and use of a virtual development and/or test environment in one embodiment of the SYNONYM.

FIG. 1A is of a block diagram illustrating the creation and use of a virtual development and/or test environment in one embodiment of the SYNONYM. In FIG. 1A, a request to create a new virtual development and/or test environment is received 105. In one embodiment, such a request may come from a member of a development team and/or a testing team of a project, from a person responsible for setting up development environments for projects, and/or the like. In another embodiment, such a request may be issued automatically as part of creating a new software application/component, modifying features of an application component, adding support for new data types, and/or the like. The request may come in the form of an email, a programmatic request to create a new virtual development and/or test environment, and/or the like. In one implementation, a web based user interface may provide text fields, checkboxes, radio buttons, and/or the like to accept user input specifying administrative information and parameters indicative of the testing requirements of a project. See FIG. 1C for a screen shot diagram illustrating a web based user interface in one embodiment of the SYNONYM. For example, such data may include user name 181, user ID 182, list of required environments 183, project name 184, project ID 185, list of required applications 186, list of required databases 187, and/or the like. The parameters may be stored in XML, and upon submission by a user sent via HTTP post to a SYNONYM server. In one implementation, the request takes on the following form:

```
<XML>
    <USER>
        <USER NAME>Toni</USER NAME>
        <USER ID>U1234</USER ID>
    </USER>
    <ENVIRONMENT>MAINFRAME</ENVIRONMENT>
    <PROJECT>
        <PROJECT NAME>New_Application</PROJECT NAME>
        <PROJECT ID>P5678</PROJECT ID>
    </PROJECT>
    <REQUIRED APPLICATIONS>
        <APPLICATION>Microsoft_Visio</APPLICATION>
        <APPLICATION>Eclipse</APPLICATION>
    </REQUIRED APPLICATIONS>
    <REQUIRED DATABASES>
        <DATABASE>SYN_CUSTOMERS</DATABASE>
        <DATABASE>SYN_ACCOUNTS</DATABASE>
        <DATABASE>SYN_DEPOSITS</DATABASE>
    </REQUIRED DATABASES >
</XML>
```

In some cases, it may be useful to limit access from actual data, for privacy concerns, policy concerns, and/or because US and international regulations limit the use and sharing of personal information and various regional, local, industry-wide, or company rules and/or customs limit the use and disclosure of information regarding certain business relationships or transactions of a person or entity (e.g., various restrictions may exist with regard to using real customer data for testing, especially when such testing is outsourced or off-shored). A virtual development and/or test environment may therefore use synthesized data during testing instead of real data. In one embodiment, such synthesized data may be based on anonymized real data. In one implementation, anonymized data may be created 107 by replacing data values in particular database fields with anonymized versions of those data values. Further details regarding the creation of anonymized data are provided later in the specification. In one implementation, synthesized data may be created 110 by synthesizing new data records based on anonymized real data. In one implementation, the amount of data stored in a synthetic database (synbase) may be reduced to increase efficiency. Further details regarding the creation of synthesized data are provided later in the specification.

In alternative embodiments, real data and/or modified real data, such as real data with modified IP addresses and/or modified domain/machine/server names, may be used instead of synthesized data. In one embodiment, the synthetic deployment environment includes applications allowing mirroring by duplicating current environments. For example, real data and/or modified real data may be used for mirroring using a synchronization technology, such as rsync, running through a job scheduler, such as cron. In one embodiment, the IP addresses may be dynamically assigned to such additional copies, the new domain/machine/server names may use the previous name and ad an incremental counter (e.g., PREVIOUS_NAME would become PREVIOUS_NAME_02, PREVIOUS_NAME_03, etc.). In another embodiment, the synthetic deployment environment includes applications allowing load balancing of current systems by deploying a number of synthetic environments adding additional capacity. For example, real data and/or modified real data may be used for load balancing among multiple synthetic environments using a round robin scheduling algorithm. In such an embodiment, the subsequently duplicated synthetic environments with new identifiers may each become a part of the round robin pool geographically, or based on the round-robin time allocation (e.g., each synthetic environment handling a portion of work load for set quantum of time). In yet another embodiment, the synthetic deployment environment includes applications allowing grid computing by deploying a number of synthetic environments working in parallel. For example, real data and/or modified real data may be used in grid computing using distributing computing technology, such as Mac OS X Xgrid (e.g., where the duplicated renamed synthetic environments act as individual processing nodes in the grid).

Figure 6A:
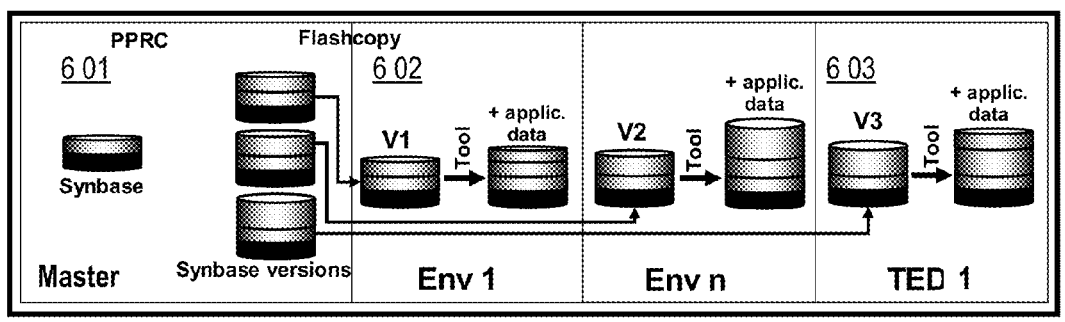
FIG. 6A is of a block diagram illustrating copying of a synthetic database from a "master" virtual development and/or test environment to new virtual development and/or test environments in one embodiment of the SYNONYM.
Figure 6B:
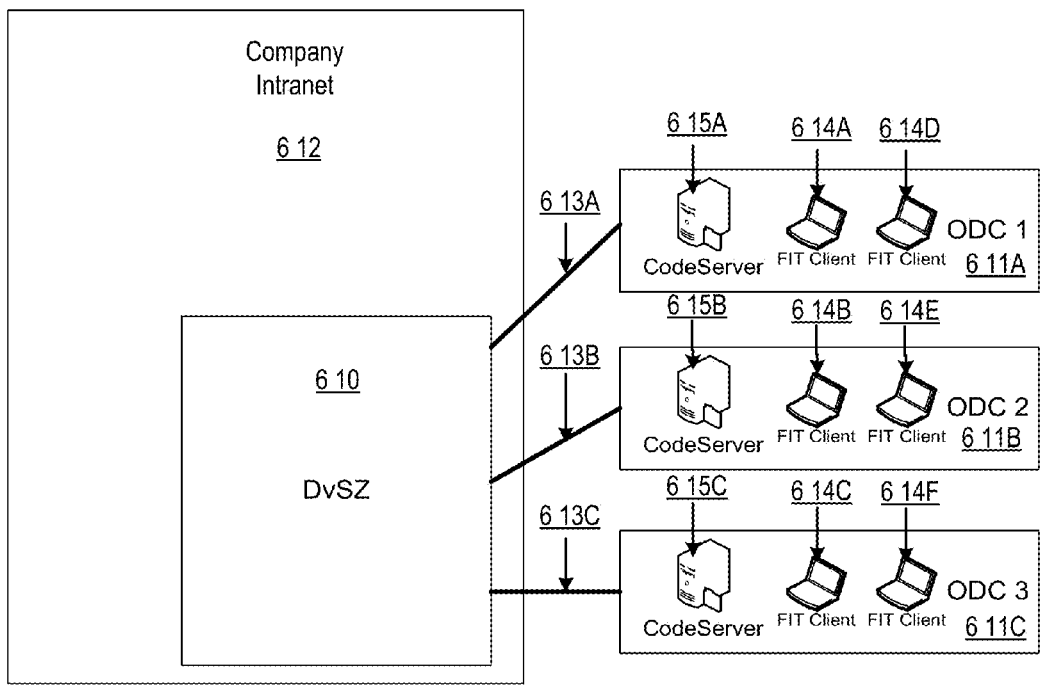
FIG. 6B is of a block diagram illustrating Developer Server Zone (DvSZ) and Offshore Development Centers (ODC) in one embodiment of the SYNONYM.
Figure 6C:
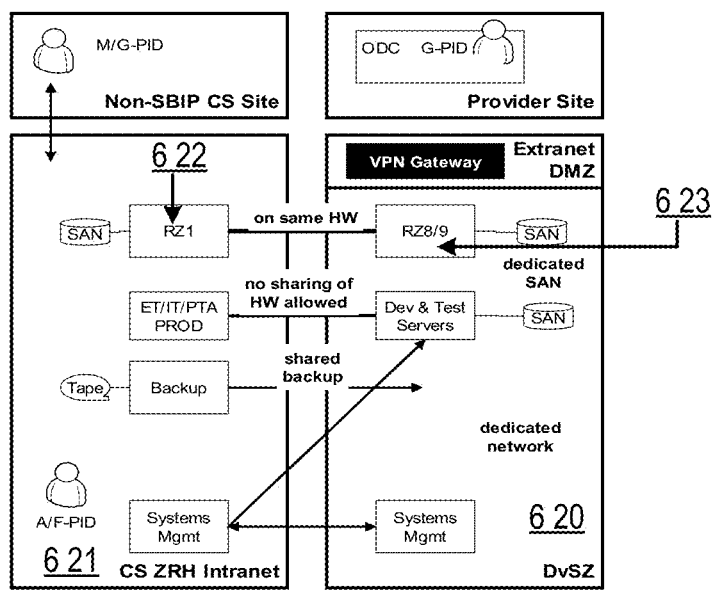
FIG. 6C is of a block diagram illustrating dedicated use of hardware in a DvSZ in one embodiment of the SYNONYM.

A virtual development and/or test environment may be created 115 in response to the request to create a new virtual development and/or test environment. In one embodiment, the virtual development and/or test environment may be persistent (ENV) and shared across multiple projects. In another embodiment, the virtual development and/or test environment may be created on demand (TED) and used by a single project. In yet another embodiment, the virtual development and/or test environment may use a database containing synthesized data records ("synbase" hereinafter). In another implementation, the virtual development and/or test environment may select one out of a plurality of synbase versions to use for testing. In one embodiment, the virtual development and/or test environment may be physically and/or logically separated from a production environment. See FIG. 6C for a block diagram illustrating dedicated use of hardware in a DvSZ in one embodiment of the SYNONYM. In FIG. 6C, no sharing of hardware is allowed between the DvSZ 620 and the company intranet 621. An exception is made for the mainframe, and the mainframe is instead separated logically into RZ1 622 and RZ8/9 623 between the company intranet and the DvSZ respectively.

Figure 6D:
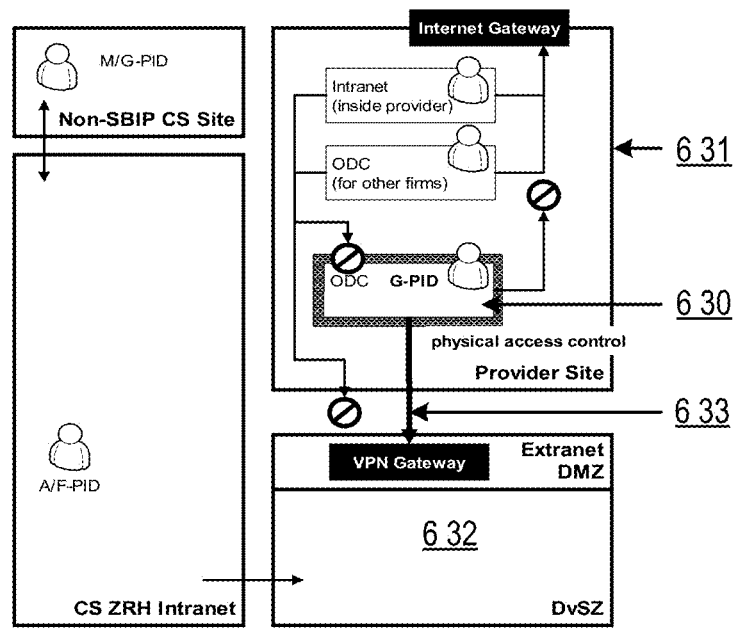
FIG. 6D is of a block diagram illustrating physical access control at the ODC in one embodiment of the SYNONYM.
Figure 6E:
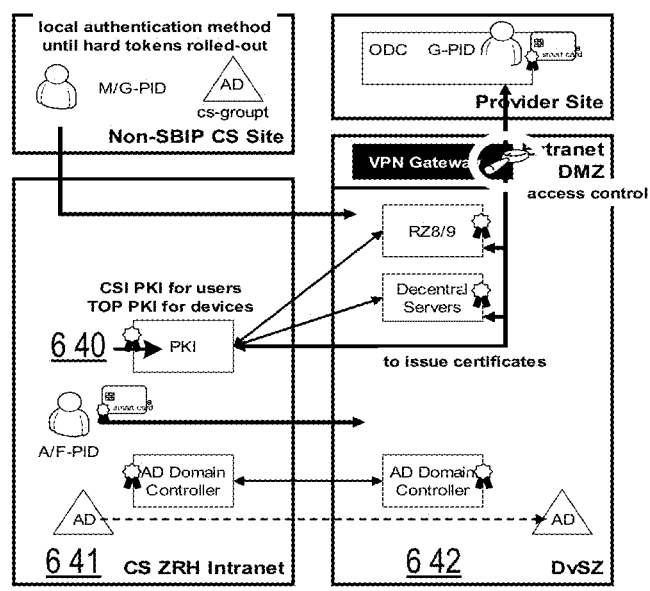
FIG. 6E is of a block diagram illustrating the use of public key infrastructure (PKI) in one embodiment of the SYNONYM.
Figure 6F:
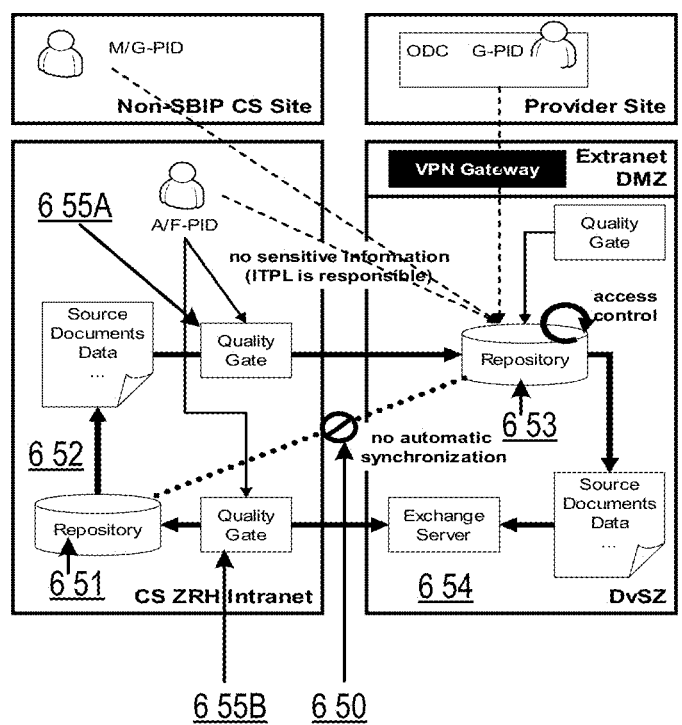
FIG. 6F is of a block diagram illustrating transfer of sensitive info into the DvSZ in one embodiment of the SYNONYM.
Figure 6G:
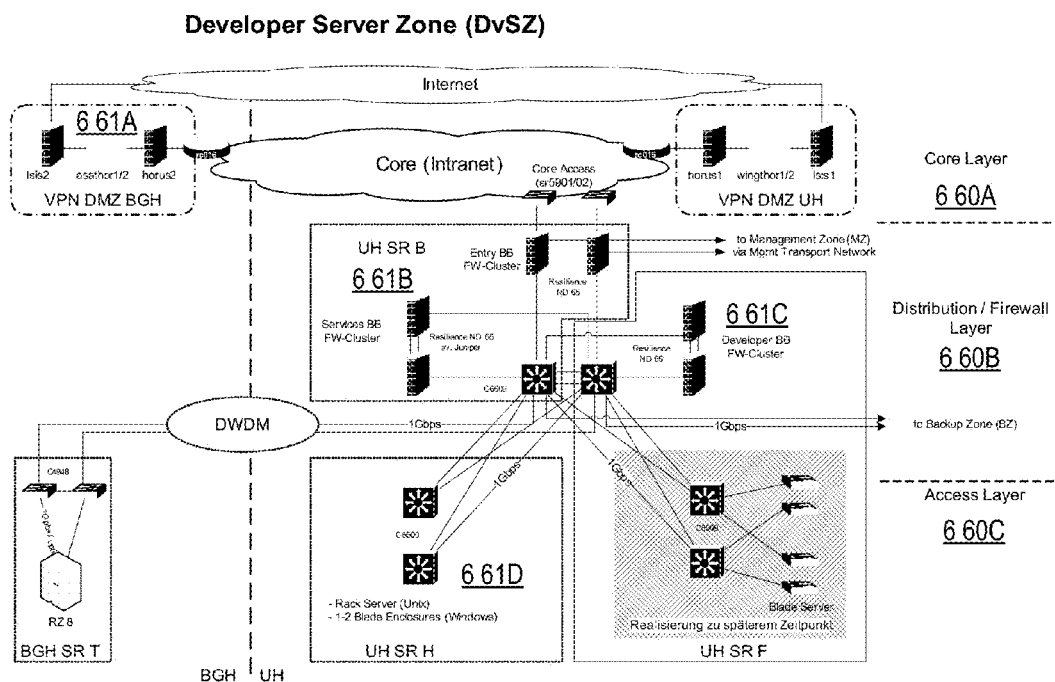
FIG. 6G is of a block diagram illustrating DvSZ network layout in one embodiment of the SYNONYM.

In one implementation, different security certificates (e.g., security certificates based on Public Key Infrastructure) may be issued to resources in the virtual development and/or test environment and in the production environment. See FIG. 6E for an example SYNONYM embodiment showing a block diagram illustrating the use of public key infrastructure (PKI). In FIG. 6E, the PKI 640 in the company intranet 641 issues security certificates to computers in the company intranet 641 and in the DvSZ 642. The PKI 640 issues different security certificates to resources in the company intranet 641 and to resources in the DvSZ 642. A communication between a client and a server can only succeed if both resources have either test security certificates or production security certificates. For example, such resources may include Java Application Platform servers, CORBA adapters, database servers, and/or the like. In one implementation, a Development and Test Server Zone may be created to contain the virtual development and/or test environment. For example, a dedicated network, separated from the rest of an organization's intranet and limited in its ability to access the organization's intranet, using components such as firewall, VPN Gateway, security certificates, and/or the like may be setup using dedicated routers. Access to the DvSZ may be limited to strongly authenticated users only and no sensitive information may be accessible in the DvSZ. Furthermore, the DvSZ may be implemented as a "black hole" network zone. As such, any information exchange between the DvSZ and outside data sources is allowed only if it is initiated from outside the DvSZ. See FIG. 6F for a block diagram illustrating transfer of sensitive info into the DvSZ in one embodiment of the SYNONYM. FIG. 6F, illustrates that there is no automatic synchronization 650 of information between repositories 651 in the company intranet 652 and repositories 653 in the DvSZ 654. Only sensitive information cleared through a quality gate 655A-B may be transferred in the DvSZ. The establishment of a connection from inside the DvSZ 654 to a resource outside is blocked. Information cleared for use in the DvSZ may be accessible only to those users of the DvSZ that are authorized to use the information. See FIG. 6G for a block diagram illustrating DvSZ network layout in one embodiment of the SYNONYM. FIG. 6G illustrates how the network is set up 660A-C, and the hardware 661A-D used for the set up. Further details regarding the creation of a virtual development and/or test environment are provided later in the specification. User accounts authorized to use a virtual development and/or test environment may be instantiated 120. In one embodiment, a variety of user account types, with a range of rights and authentication requirements may be instantiated. Further details regarding the instantiation of user accounts are provided later in the specification.

Authorized users may perform required development and testing 125 using a virtual development and/or testing environment and/or associated synbase. In one embodiment, such testing may include unit testing, feature testing, application testing, and/or the like. In one implementation, the testing may be performed by dedicated human testers checking test results against specified performance parameters. In another implementation, the testing may be performed by automated test routines checking test results against predefined values or tested averages. For example, the result of a "check account balance" operation used on a newly created account may be compared against a predefined value of $0 to ensure that the operation behaves correctly for this test case. As another example, the time to complete "check account balance" operations may be tracked and the average completion time compared to the time taken to complete the current "check account balance" operation to test execution speed. In another embodiment, randomized values may be placed into input fields to determine if a program component handles errors properly, by logging/tracking the program responses to such value entries. In another embodiment, application source code may be tested for hard coding of sensitive data. In one implementation, a Legal Parser may be used to identify potentially sensitive data within a source code file written in a programming language, such as PL/I, Java, and/or the like, which might violate established privacy or secrecy rules. For example, a department responsible for specifying privacy rules, such as Legal and Compliance department, may specify a list of potentially sensitive types of data (e.g., Names, CIF numbers, account numbers, and/or the like). The Legal Parser may then be used to scan source code files of a project for potential matches and provide notification of any such matches. For example, source code and comments may be scanned using standard parsing techniques, such as by using the m// operator in Perl, e.g., m/$LegalParser/ for occurrences of a 12 digit number, which corresponds to the length of a CIF number. In such an embodiment, a LegalParser data structure (e.g., a file, memory struct, etc.) may house a list of flagged terms, numbers, etc., which will be used to check for unauthorized use of such. A variety of methods may be used to exchange information among test team members during testing. In one implementation, email, instant messaging, http posts, and/or the like protocols may be used to exchange information. For example, test team members may send emails to each other using email software, such as Microsoft Outlook, Lotus Notes, and/or the like, to ask questions and to receive answers. In another implementation, technologies, such as Microsoft SharePoint, that provide document management, discussion forums, surveys and email based notifications may be used to exchange information. In one embodiment, the synthetic deployment environment may be used to simulate a virtual bank. In another embodiment, the synthetic deployment environment may be used for generating synthetic deployment environments in fields such as, gaming, simulation, education, medicine, quality control, and/or the like.

A virtual development and/or test environment may be decommissioned 130 upon request. For example, a virtual development and/or test environment may be decommissioned upon completion of testing required for a particular application component, project phase, project, and/or the like. In one implementation, such decommissioning may involve secure deletion, including multiple data wipes, of user accounts and synbase associated with the virtual development and/or test environment. In another embodiment, decommissioning may include archiving of the environment to an owning company, and secure deletion of the environment at an outsourcing vendor location.

Figure 1B:
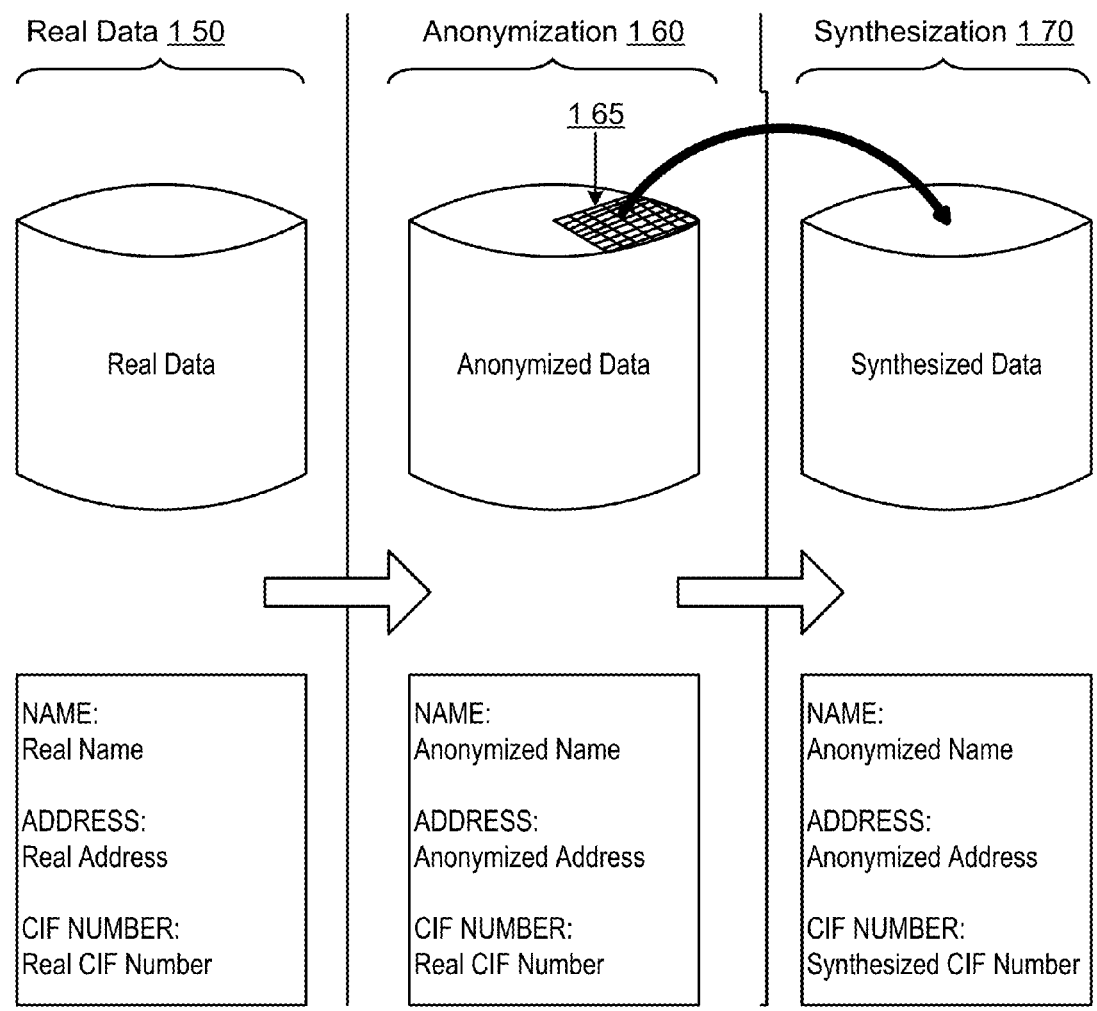
FIG. 1B is of a data flow diagram illustrating the transformation of real data into synthetic data in one embodiment of the SYNONYM.

FIG. 1B is of a data flow diagram illustrating the transformation of real data into synthetic data in one embodiment of the SYNONYM. In order to provide realistic data for the virtual development and/or test environment, in one implementation, real data 150 may be used as the basis for synthesized data. In one implementation, real data may include fields such as customer name, customer address, customer information file (CIF) number, and/or the like. In one embodiment, real data is converted into anonymized data 160. In one implementation, anonymization may involve replacing customer name and customer address fields with anonymized versions of these fields created according to predefined rules. Further details regarding the creation of anonymized data are provided later in the specification. In one embodiment, anonymized data is converted into synthesized data 170. In one implementation, a subset of anonymized data 165 representative of each customer type requested for testing may be selected for synthesization. In one embodiment, the data set reduction is responsive to more effectively test a particular type of data. For example, there may be several types of accounts, SYNONYM may use just one or a select few types of accounts for testing (e.g., premium accounts may hold a greater number and diversity of account types and as such, may act as better data sets for stress testing a system). In another embodiment, the subset acts to reduce the amount of synthesized data to facilitate faster testing cycles. The selected data may be converted into synthesized data by creating a new CIF for each selected customer and by updating the CIF number of each customer to point to the newly created synthetic CIF. Further details regarding the creation of synthesized data are provided later in the specification.

Figure 2A:
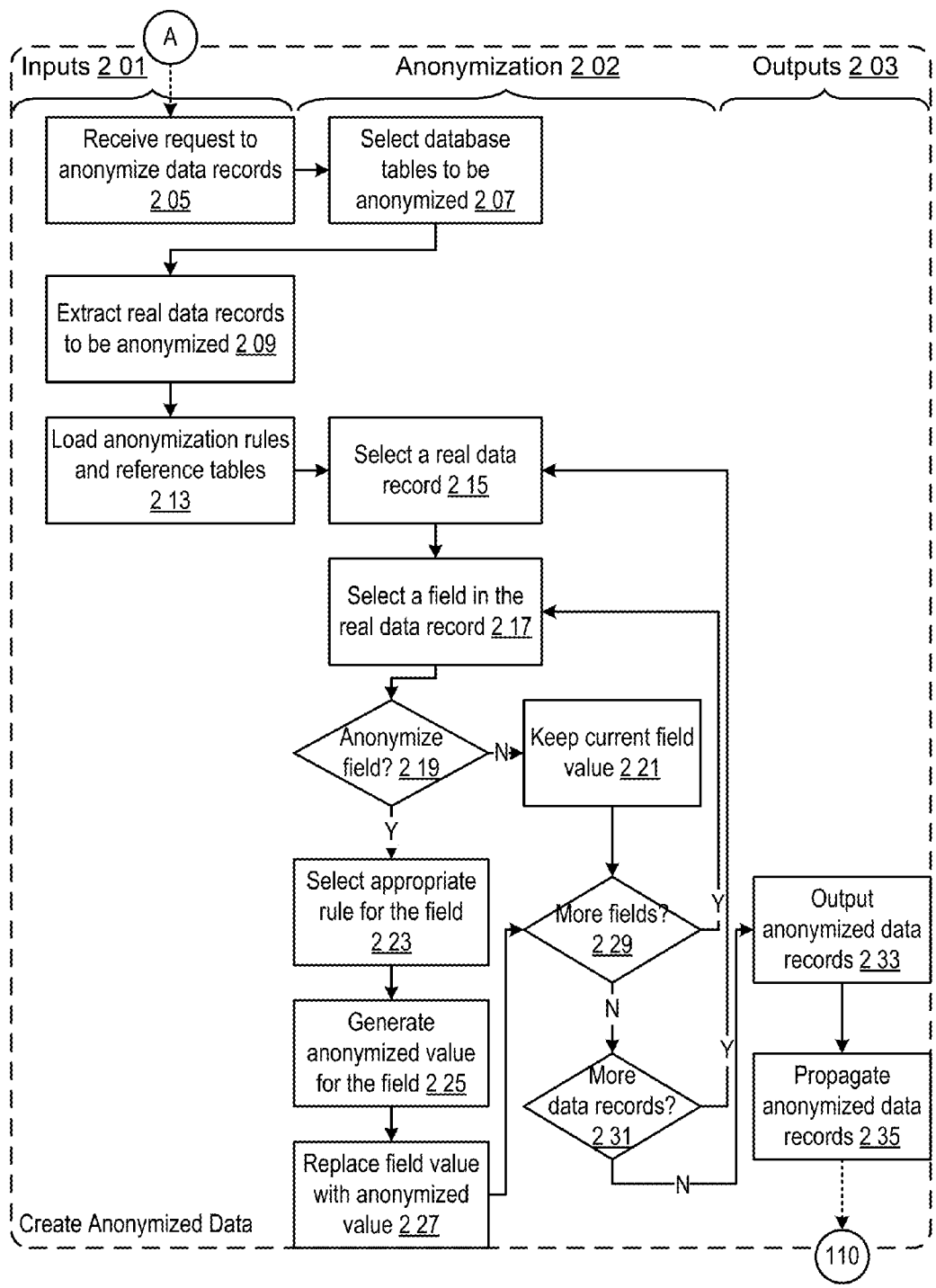
FIG. 2A is of a logic flow diagram illustrating creation of anonymized data in one embodiment of the SYNONYM.
Figure 2C:
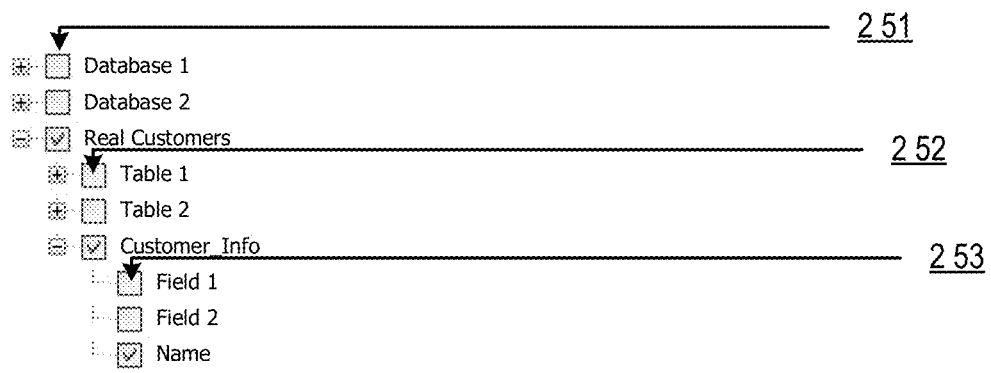
FIG. 2C is of screen shot diagram illustrating a web form based user interface in one embodiment of the SYNONYM.

FIG. 2A is of a logic flow diagram illustrating creation of anonymized data in one embodiment of the SYNONYM. In FIG. 2A, a request to anonymize data records is received 205. In one embodiment, the request may contain a list of databases 251, database tables 252, and data fields 253 that need to be anonymized. The list of databases, database tables, and data fields may be based on the input of a user who requested a new test environment. In one implementation, the list may be in XML format and the request may take on the following form:

```
<XML>
    <ANONYMIZATION DATABASES>
        <DATABASE>
            <DATABASE NAME>REAL_CUSTOMERS</DATABASE NAME>
            <TABLE>
                <TABLE NAME>Customer_Info</TABLE NAME>
                <TABLE FIELD>Name</TABLE FIELD>
            </TABLE>
        </DATABASE>
    </ANONYMIZATION DATABASES>
</XML>
```

In one embodiment, the above XML may result from user selections of pop-up menu entries in a web form. See FIG. 2C for a screen shot diagram illustrating a web form based user interface in one embodiment of the SYNONYM. In another implementation, the list may be stored in a database table and accessed by SYNONYM via an SQL SELECT command. In yet another embodiment, the list may be stored in a configuration file and accessed by SYNONYM using I/O calls that allow reading from a file. Based on the list, the database tables to be anonymized are selected 207 and data records are extracted for processing 209. In one implementation, such selection may be accomplished via one or more SQL SELECT commands (e.g., SELECT CIF, Name FROM Customer_Info) and extraction may be accomplished by placing the selected data records into a data file. Anonymization rules and reference tables may be loaded at 213. Anonymization rules specify how to generate anonymized replacement values for a particular field. FIG. 2B is a table illustrating anonymization rules in one embodiment of the SYNONYM. Reference tables contain data that may be used as replacement values according to anonymization rules. For example, in one implementation, a reference table may contain a list of 676 male and female names along with a list of regions where each name is commonly used. In one embodiment, a table is populated with made up names; in one embodiment a name generator (e.g., www.fakenamegenerator.com) may be used to generate and/or populate a database table of made up names.

In one embodiment, a data record containing real data may be selected 215 from the data file for anonymization. For example, I/O calls that allow reading from a data file may be used. The data record may be parsed to select the next available field 217 using a parsing algorithm. In one implementation, standard XML formatting may be used to facilitate parsing. A determination is made whether the currently selected field needs to be anonymized 219 based on the anonymization rules. For example, the name of the field may be compared to the list of field names in the anonymization rules. If the field name is not one of the field names specified in the anonymization rules, then the current field value is kept 221. Otherwise, an appropriate rule for the field is selected 223 from the anonymization rules. In one implementation, the anonymization rules may be loaded and comparison performed using a programming language, such as PL/I, Perl, and/or the like. In one embodiment, an example of the PL/I rules may take the following form:

```
if ($fieldType == TYPE_FIRST_NAME)
    replaceFirstName($field);
if ($fieldType == TYPE_ADDRESS)
    replaceAddress($field);
```

Based on the anonymization rule, an anonymized value is generated for the field 225. In one embodiment, the anonymized value may be generated by randomly selecting a value from a list of applicable values from a reference table specified in the anonymization rules, e.g., from a made up name table. In another embodiment, the anonymized value may be randomly generated based on instructions specified in the anonymization rules. The generated anonymized value replaces the original field value 227. If there are more fields in the currently selected data record, the next field may be selected for anonymization 229, otherwise, the next available record may be selected for anonymization 231. Once all data records are anonymized, the anonymized data may be output to one or more data files 233 using I/O calls that allow writing to a data file. In one implementation, the data is written out to a new data file. In another implementation, the existing data file is overwritten with new anonymized data. The anonymized data is propagated 235 to allow all parts of SYNONYM access to the anonymized data. For example, the anonymized data may be copied to files and/or databases on storage partitions designed to work with various operating systems such as Microsoft Windows XP, Unix, Apple Macintosh OS and/or the like.

Figure 3:
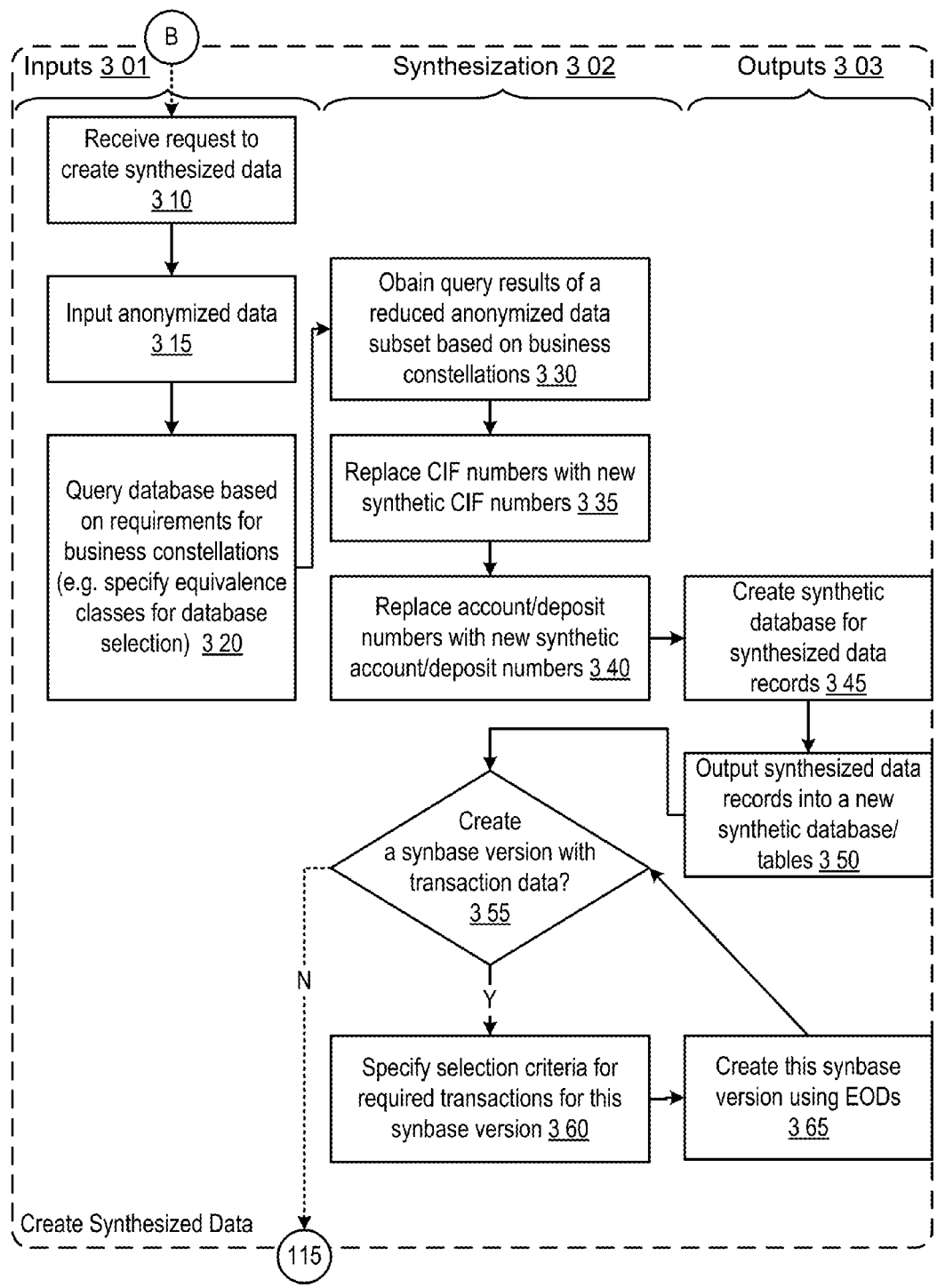
FIG. 3 is of a logic flow diagram illustrating creation of synthesized data in one embodiment of the SYNONYM.

FIG. 3 is of a logic flow diagram illustrating creation of synthesized data in one embodiment of the SYNONYM. In FIG. 3, a request to create synthesized data is received 310. In one embodiment, the request may contain a list of databases that should be used in synthesization. The list of databases may be based on the input of a user who requested a new test environment. In one implementation, the list may be in XML format and the request may take on the following form:

```
<XML>
    <SYNTHESIZATION DATABASES>
        <DATABASE NAME>ANONYMIZED_CUSTOMERS</DATABASE NAME>
        <DATABASE NAME>ANONYMIZED_ADDRESSES</DATABASE NAME>
    </SYNTHESIZATION DATABASES>
</XML>
```

In another implementation, the list may be stored in a database table and accessed by SYNONYM via SQL commands. For example, a web interface that allows a user to select databases (e.g., via checkboxes) that should be used in the synthesization may be used. The above XML may be sent to SYNONYM, which may connect to the specified databases using database adapters, such as by using adapters available through the Open Database Connectivity (ODBC) API protocol, adapters available through the WebObjects Enterprise Objects Framework (EOF), and/or the like. In yet another embodiment, the list may be stored in a configuration file and accessed by SYNONYM using I/O calls that allow reading from a file. Based on the list, anonymized data is input 315 for synthesization. In one implementation, the anonymized data is input by providing the name of one or more files containing the anonymized data. In another implementation, the anonymized data is input by providing the name of one or more SQL databases and/or tables containing the anonymized data and/or through an SQL SELECT of the specified tables. In yet another implementation, the anonymized data is exported from one or more SQL database to one or more files and the names of these files are input. In one embodiment, other data associated with the anonymized data is also input.

The request to create synthesized data may also specify that a subset of the data representative of each customer type requested for testing should be selected for synthesization to reduce the amount of synthesized data. In one embodiment, the subset of data that should be selected may be specified in terms of business constellations, and business constellations may be specified in terms of equivalence classes. In one implementation, an equivalence class may include: Title, Business Unit, Branch Office, Nationality, Domicile, Language, Customer Type, Customer Segment, etc., and a business constellation may include a unique combination of values of one or more equivalence classes. For example, a business constellation may be specified as a male business customer from the US. This business constellation may be passed in XML format as part of the request as follows:

```
<XML>
    <BUSINESS CONSTELLATIONs>
        <BUSINESS CONSTELLATION>
            <CUSTOMER TYPE>Male</CUSTOMER TYPE>
            <CUSTOMER SEGMENT>Business</CUSTOMER SEGMENT>
            <DOMICILE>US</DOMICILE>
        </BUSINESS CONSTELLATION>
    </BUSINESS CONSTELLATIONs>
</XML>
```

The data may be queried based on the specified business constellations 320. In one embodiment, programmatic commands, written in any programming language, such as C++, Perl, SQL, and/or the like, may be issued to compare values of the data to values specified in a business constellation. In another embodiment, an SQL SELECT for a customer type may provide a subset of numerous search results, which may be used. A subset of data representative of all specified business constellations may then be obtained 330 based on the comparisons. In one implementation, the first data record encountered that satisfies all equivalence classes of a given business constellation is chosen to represent the given business constellation. Each business constellation may also be represented by multiple data records up to some maximum specified number.

Synthesized data is based on the subset of data representative of all specified business constellations. In one embodiment, new customer information files with new CIF numbers may be created for each customer in the subset of data, and the CIF numbers in the anonymized data and in other data associated with the anonymized data may be replaced with new synthetic CIF numbers 335. For example, new CIF numbers may be randomly and/or serially generated to be unique and to have the same format as real CIF numbers. In one implementation, the number ranges used to generate synthesized CIF numbers may be forbidden in the production environment. After this is done, it is no longer possible to determine any actual customer identification information from the new CIF numbers or to trace the new synthesized CIF data to any actual customer. In one implementation, the resulting synthesized data is output to one or more data files using I/O calls that allow writing to a data file.

A synthetic database may be created 345 to hold the new synthesized data. In one embodiment, a new synbase is created using any number of database platforms such as Microsoft SQL Server, MySQL, and/or the like. For example, it may be created with the following mySQL SQL command:

create database DBname;

In another embodiment, contents of an existing synbase may be deleted (e.g., using SQL DELETE FROM synbase_table_name [WHERE constraint]) and/or be overwritten (e.g., using SQL UPDATE synbase_table_name SET field_value='SomeNewValue' [WHERE constraint]) with synthesized data.

In an alternative embodiment, other data corresponding to the synthesized data may be similarly synthesized before creating a synthetic database at 345. In one implementation, new accounts/deposits with new account/deposit numbers may be created for accounts/deposits associated with the synthesized CIF data, and the account/deposit numbers are replaced with new account/deposit numbers 340. For example, new account/deposit numbers may be randomly generated to be unique and to have the same format as real account/deposit numbers. In one implementation, the number ranges used to generate synthesized account/deposit numbers may be forbidden in the production environment.

The synthesized data is placed into a synbase 350. In one implementation, the synthesized data, stored in one or more data files, may be read using I/O calls that allow reading from a data file, parsed, such as by using the m// operator in Perl (e.g., m/|.*|/ to extract a field value enclosed by "|"), and placed into a synbase using SQL commands. A determination is made as to whether the virtual development and/or test environment should have transaction data in addition to synthesized data 355. In one embodiment, such determination may be made by checking the request to synthesize data for further information specifying end of day jobs (EODs) that should be run to create transaction data. For example, in one implementation, this information may be passed in XML format as part of the request as follows:

```
<XML>
    <EODs>
        <EOD>MakePayments</EOD>
        <EOD>CancelPayments</EOD>
    </EODs>
</XML>
```

In one embodiment, EODs may specify the selection criteria for transactions that should be created for the virtual development and/or test environment 360. For example, in one implementation, an EOD may trigger the creation of a specific type of transaction data (e.g., EOD MakePayments may create transaction data simulating payments being made by customers, while EOD CancelPayments may create transaction data simulating customers canceling payments). Thus, specifying that a given EOD should be run to create transaction data, also determines the kind of transaction data that should be created. Using EODs, a synbase version that includes transaction data is created 365. In one embodiment, transaction data, such as money transfers between two customers, may be simulated by an EOD by creating a specified number of random money transfer transactions (e.g., in Perl to select two random accounts, select a number within a specified range that represents an amount to be transferred, and transfer that amount from the first to the second account), and outputting data records representing these transactions to a file using I/O calls. In one implementation the transaction data records along with synbase data are copied to a new synbase (e.g., by using adapters available through the Open Database Connectivity (ODBC) API standard, adapters available through the WebObjects Enterprise Objects Framework (EOF), and/or the like), which comprises a new synbase version. In another implementation only the transaction data records are copied into a separate database or separate database table, and together with the synthesized data the two parts comprise a new synbase version.

Figure 4:
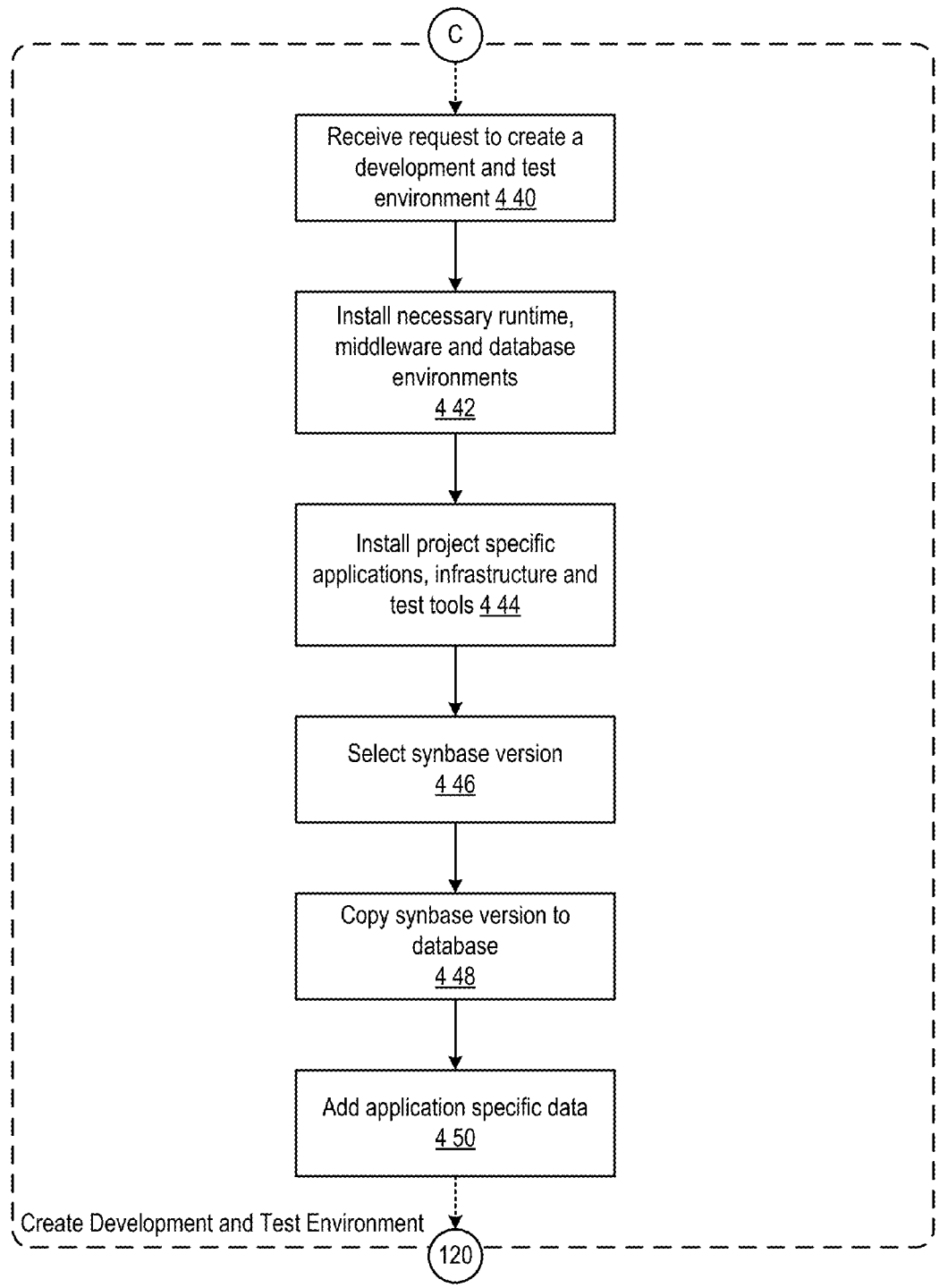
FIG. 4 is of a logic flow diagram illustrating creation of a virtual development and/or test environment in one embodiment of the SYNONYM.

FIG. 4 is of a logic flow diagram illustrating creation of a virtual development and/or test environment in one embodiment of the SYNONYM. In FIG. 4, a request to create a virtual development and/or test environment is received 440. In one embodiment, this request may be based on the input of a user who requested a new test environment, as described above, and may specify various environments, applications and databases desired by the user. In one implementation, the request takes on the following form:

```
<XML>
    <ENVIRONMENT>MAINFRAME</ENVIRONMENT>
    <REQUIRED APPLICATIONS>
        <APPLICATION>Microsoft_Visio</APPLICATION>
        <APPLICATION> Eclipse</APPLICATION>
    </REQUIRED APPLICATIONS>
    <REQUIRED DATABASES>
        <DATABASE>SYN_CUSTOMERS</DATABASE>
        <DATABASE>SYN_ACCOUNTS</DATABASE>
        <DATABASE>SYN_DEPOSITS</DATABASE>
    </REQUIRED DATABASES >
</XML>
```

At 442, the requested runtime, middleware, database and/or the like environments are installed. In one implementation, such software may comprise an operating system, such as Microsoft Windows XP, Unix, Apple Macintosh OS and/or the like; runtime environments, such as Java Runtime Environment, GTK+, and/or the like; middleware, such as CORBA, DCOM, RPC and/or the like; and database environments, such as Microsoft SQL Server, MySQL, and/or the like. At 444, the requested project specific applications, infrastructure and test tools are installed. In one implementation, such software may comprise applications, such as a web server for web-based projects; infrastructure, such as Concurrent Versioning System (CVS); and test tools, such as SilkTest. The requested synbase version is selected 446 and copied to one or more databases used by the virtual development and/or test environment 448. In one embodiment, various synbase versions may reside on a "master" virtual development and/or test environment. When a request to create a new virtual development and/or test environment is received, the requested synbase version may be copied from the "master" virtual development and/or test environment to the new virtual development and/or test environment. In one implementation, a synbase version with no transaction data may be copied from the "master" virtual development and/or test environment to the new virtual development and/or test environment as part of the FIT image. For example, such copying may be done by a fast copy utility such as IBM FlashCopy. See FIG. 6A for a block diagram illustrating copying of a synthetic database from a "master" virtual development and/or test environment 601 to new virtual development and/or test environments in one embodiment of the SYNONYM. In FIG. 6A, synbase version 1 is copied from the "master" virtual development and/or test environment 601 to a persistent Env 1 virtual development and/or test environment 602 using FlashCopy, and application specific data described in 450 is added to the data repository. Synbase version 3 is copied from the "master" virtual development and/or test environment 601 to a new TED 1 virtual development and/or test environment 603 using FlashCopy, and new application specific data described in 450 is added to the data repository.

In one embodiment, application specific data may be added 450 to the data repository used by the virtual development and/or test environment. In one implementation, Wiki pages containing project specific information may store their data in one or more databases. In another implementation, source code in programming languages such as Java, PL/I, and/or the like is added through the CVS.

Figure 5:
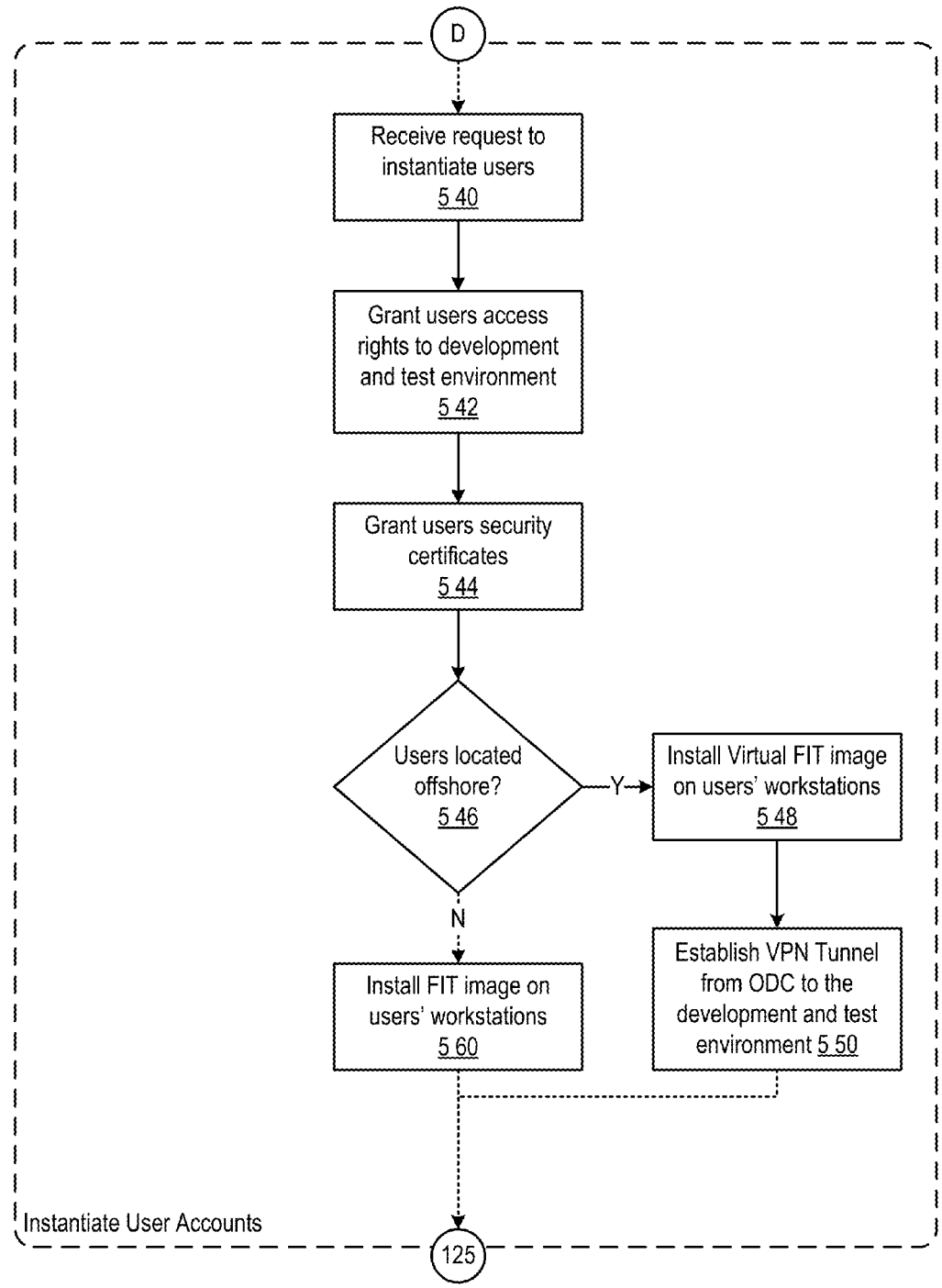
FIG. 5 is of a logic flow diagram illustrating instantiation of user accounts in one embodiment of the SYNONYM.

FIG. 5 is of a logic flow diagram illustrating instantiation of user accounts in one embodiment of the SYNONYM. In FIG. 5, a request to instantiate users is received 540. In one embodiment, this request may be based on the input of a user who requested a new test environment, as described above, and may specify a set of users and account types associated with each user. In one implementation, account types may be regular user, offshore user, and/or the like. Each account type may have different authentication and authorization settings associated with it. The specified set of users is granted access rights to the virtual development and/or test environment 542 and issued security certificates 544 to use for authentications and/or authorization. In one implementation, such security certificates may be based on Public Key Infrastructure and issued by a Certificate Authority. In another implementation, such security certificates may be stored on SmartCards. In one embodiment, access to resources may be limited to users that require those resources for their work. Thus, users with the same account type may have access to different resources. In one implementation, access rights may be revoked at well defined time points (e.g., at project closure) or after a predefined time period (e.g., 6 months).

A First Installation Tool (FIT) image is a collection of software that may be used to provide each computer in an organization with the same basic set of software. In one embodiment a FIT image may contain an operating system, such as Windows XP; a web browser, such as Microsoft Internet Explorer; an antivirus, such as McAfee Antivirus; VPN software, such as CheckPoint VPN Connectivity and Integrity Client; access software, such as IBM Personal Communications; and a set of office productivity software, such as Microsoft Word, Microsoft Excel, Microsoft PowerPoint, and Microsoft Outlook. In one implementation, development tools required by projects for development and testing may exist as pre-packaged bundles for FIT (e.g., TIPD, SSH clients, 3270 terminal emulation, Rational software, Eclipse, Clear Case, Clear Quest, and/or the like). In one implementation, software included in a FIT image may differ based on predefined profiles. For example, such profiles may include a profile for a server, a desktop computer, a profile for a notebook computer, a profile for a mobile device, and/or the like. In one implementation, the profiles may be specified as below:

```
<XML>
    <PROFILE>
        <TYPE>DESKTOP</TYPE>
        <SOFTWARE>WindowsXP</SOFTWARE>
        <SOFTWARE>MicrosoftOfficeXP</SOFTWARE>
    </PROFILE>
    <PROFILE>
        <TYPE>MOBILE</TYPE>
```

-continued

```
        <SOFTWARE>WindowsMobile6.0</SOFTWARE>
        <SOFTWARE>MicrosoftOfficeMobile</SOFTWARE>
    </PROFILE>
</XML>
```

Additional software may also be installed on a computer with a FIT image on request. Such additional software may include programs such as Microsoft Visio, Microsoft Project, Eclipse, and/or the like. At 546, a determination may be made which users in the specified set of users are regular users and which are offshore users. In one embodiment, users located locally may have a FIT image along with any additional software installed on their computers 560 using a deployment tool, such as Windows Deployment Services, and may access SYNONYM. In another embodiment, a VMware disk image may be used to package and deploy a FIT image. For example, software applications to be included in the FIT image may be packaged as VMware ThinApps and included in the VMware disk image. Additional required applications may be supplied with additional ThinApp installations over base (e.g., Desktop, Mobile, etc.) installations. The VMware disk image may then be deployed to a workstation using VMware software. In one embodiment, computers used by offshore users may be located in a secure offshore development center (ODC), which may be hosted by a third party provider. In one implementation, computers in an ODC are physically and/or logically separated from any other computers and access to these computer is limited to authorized personnel. For example, an ODC may be installed in physically separated rooms with physical access control and dedicated assets and resources. The network in the ODC may not be connected to the remaining network of the third party provider. The ODC may be connected to the DvSZ via VPN and offshore users not working in the ODC may not have access to the DvSZ. See FIG. 6D for a block diagram illustrating physical access control at the ODC in one embodiment of the SYNONYM. In FIG. 6D, the ODC 630 is physically separated from the rest of the third party provider's site 631. Only computers in the ODC 630 are allowed to connect with the DvSZ 632 and only through a VPN tunnel 633.

Users located offshore may have a virtual FIT image along with any additional software installed on their computers 548. In one implementation, software on the offshore users' computers may include an operating system, such as Windows XP; a virtualization software, such as VMware Player; and a FIT image used through the virtualization software (virtual FIT image). In one implementation, the virtual FIT image may be deployed using a Code Server located in the ODC. A Code Server may serve to install FIT image on workstations in an ODC, to distribute additional software to the workstations, and to provide updates (e.g., virus definition files updates for an antivirus program) for software installed on the workstations. For example, the code server may install an operating system, such as Windows XP, and a virtualization software, such as VMware Player, on a workstation. VMware Player may then be used to run a virtual FIT image packaged in a VMware disk image on the workstation. At 550, a VPN Tunnel may be established from the ODC to the virtual development and/or test environment in the DvSZ that allows offshore users access to SYNONYM. In one implementation, authentication of the VPN counterparts may be done on a system level and not on a user level. In one implementation, offshore users may have access only to services inside the DvSZ. See FIG. 6B for a block diagram illustrating Developer Server Zone 610 and Offshore Development Centers 611A-C in one embodiment of the SYNONYM. In FIG. 6B, a DvSZ 610, separated from the rest of the company intranet 612, is connected to ODCs 1-3 through VPN tunnels 613A-C. The workstations inside the ODCs 614A-F may communicate with services inside the DvSZ using the installed FIT images obtained from code servers 615A-C. The workstations may not access services in the company intranet outside the DvSZ.

SYNONYM Controller

Figure 7:
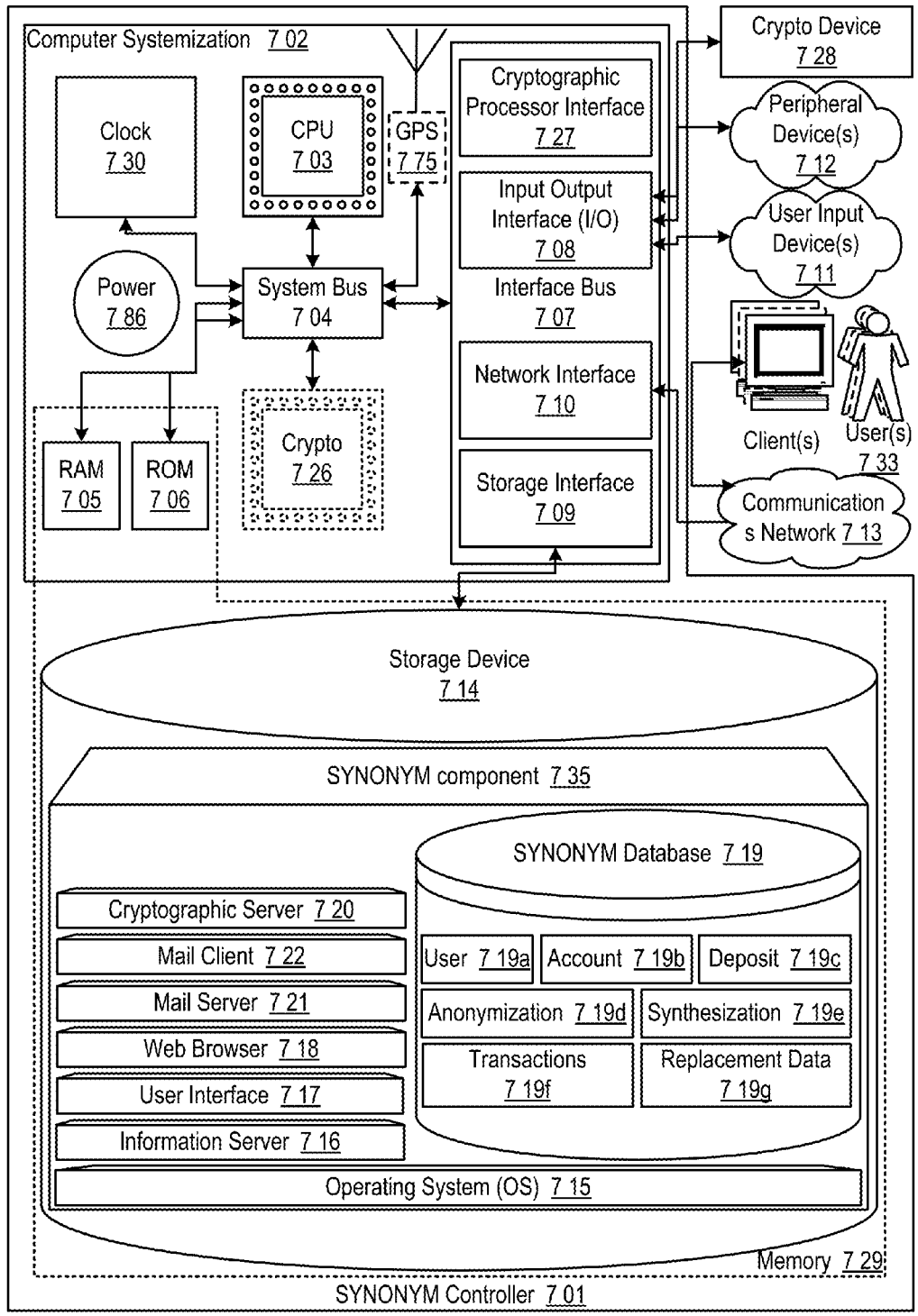
FIG. 7 is of a block diagram illustrating embodiments of the SYNONYM controller.

FIG. 7 illustrates inventive aspects of a SYNONYM controller 701 in a block diagram. In this embodiment, the SYNONYM controller 701 may serve to aggregate, process, store, search, serve, identify, instruct, generate, match, and/or facilitate interactions with a computer through a variety of information technologies, and/or other related data.

Typically, users, which may be people and/or other systems, may engage information technology systems (e.g., computers) to facilitate information processing. In turn, computers employ processors to process information; such processors 703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SYNONYM controller 701 may be connected to and/or communicate with entities such as, but not limited to: one or more users from user input devices 711; peripheral devices 712; an optional cryptographic processor device 728; and/or a communications network 713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SYNONYM controller 701 may be based on computer systems that may comprise, but are not limited to, components such as: a computer systemization 702 connected to memory 729.

Computer Systemization

A computer systemization 702 may comprise a clock 730, central processing unit ("CPU(s)" and/or "processor(s)" (these terms are used interchangeable throughout the disclosure unless noted to the contrary)) 703, a memory 729 (e.g., a read only memory (ROM) 706, a random access memory (RAM) 705, etc.), and/or an interface bus 707, and most frequently, although not necessarily, are all interconnected and/or communicating through a system bus 704 on one or more (mother)board(s) 702 having conductive and/or otherwise transportive circuit pathways through which instructions (e.g., binary encoded signals) may travel to effect communications, operations, storage, etc. Optionally, the computer systemization may be connected to an internal power source 786. Optionally, a cryptographic processor 726 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SYNONYM controller and beyond through various interfaces. Should processing requirements dictate a greater amount speed and/or capacity, distributed processors (e.g., Distributed SYNONYM), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the SYNONYM may be achieved by implementing a microcontroller such as CAST's R8051XC2 microcontroller; Intel's MCS 51 (i.e., 8051 microcontroller); and/or the like. Also, to implement certain features of the SYNONYM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SYNONYM component collection (distributed or otherwise) and/or features may be implemented via the microprocessor and/or via embedded components; e.g., via ASIC, coprocessor, DSP, FPGA, and/or the like. Alternately, some implementations of the SYNONYM may be implemented with embedded components that are configured and used to achieve a variety of features or signal processing.

Depending on the particular implementation, the embedded components may include software solutions, hardware solutions, and/or some combination of both hardware/software solutions. For example, SYNONYM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SYNONYM features. A hierarchy of programmable interconnects allow logic blocks to be interconnected as needed by the SYNONYM system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the SYNONYM may be developed on regular FPGAs and then migrated into a fixed version that more resembles ASIC implementations. Alternate or coordinating implementations may migrate SYNONYM controller features to a final ASIC instead of or in addition to FPGAs. Depending on the implementation all of the aforementioned embedded components and microprocessors may be considered the "CPU" and/or "processor" for the SYNONYM.

Power Source

The power source 786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 786 is connected to at least one of the interconnected subsequent components of the SYNONYM thereby providing an electric current to all subsequent components. In one example, the power source 786 is connected to the system bus component 704. In an alternative embodiment, an outside power source 786 is provided through a connection across the I/O 708 interface. For example, a USB and/or IEEE 1394 connection carries both data and power across the connection and is therefore a suitable source of power.

Interface Adapters

Interface bus(ses) 707 may accept, connect, and/or communicate to a number of interface adapters, conventionally although not necessarily in the form of adapter cards, such as but not limited to: input output interfaces (I/O) 708, storage interfaces 709, network interfaces 710, and/or the like. Optionally, cryptographic processor interfaces 727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 709 may accept, communicate, and/or connect to a number of storage devices such as, but not limited to: storage devices 714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 710 may accept, communicate, and/or connect to a communications network 713. Through a communications network 713, the SYNONYM controller is accessible through remote clients 733*b* (e.g., computers with web browsers) by users 733*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SYNONYM), architectures may similarly be employed to pool, load balance, and/or otherwise increase the communicative bandwidth required by the SYNONYM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 710 may be used to engage with various communications network types 713. For example, multiple network interfaces may be employed to allow for the communication over broadcast, multicast, and/or unicast networks.

Input Output interfaces (I/O) 708 may accept, communicate, and/or connect to user input devices 711, peripheral devices 712, cryptographic processor devices 728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 711 may be card readers, dongles, finger print readers, gloves, graphics tablets, joysticks, keyboards, mouse (mice), remote controls, retina readers, trackballs, trackpads, and/or the like.

Peripheral devices 712 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the SYNONYM controller may be embodied as an embedded, dedicated, and/or monitor-less (i.e., headless) device, wherein access would be provided over a network interface connection.

Cryptographic units such as, but not limited to, microcontrollers, processors 726, interfaces 727, and/or devices 728 may be attached, and/or communicate with the SYNONYM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 729. However, memory is a fungible technology and resource, thus, any number of memory embodiments may be employed in lieu of or in concert with one another. It is to be understood that the SYNONYM controller and/or a computer systemization may employ various forms of memory 729. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 729 will include ROM 706, RAM 705, and a storage device 714. A storage device 714 may be any conventional computer system storage. Storage devices may include a drum; a (fixed and/or removable) magnetic disk drive; a magneto-optical drive; an optical drive (i.e., Blueray, CD ROM/RAM/Recordable (R)/ ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 729 may contain a collection of program and/or database components and/or data such as, but not limited to: operating system component(s) 715 (operating system); information server component(s) 716 (information server); user interface component(s) 717 (user interface); Web browser component(s) 718 (Web browser); database(s) 719; mail server component(s) 721; mail client component(s) 722; cryptographic server component(s) 720 (cryptographic server); the SYNONYM component(s) 735; and/or the like (i.e., collectively a component collection). These components may be stored and accessed from the storage devices and/or from storage devices accessible through an interface bus. Although non-conventional program components such as those in the component collection, typically, are stored in a local storage device 714, they may also be loaded and/or stored in memory such as: peripheral devices, RAM, remote storage facilities through a communications network, ROM, various forms of memory, and/or the like.

Operating System

The operating system component 715 is an executable program component facilitating the operation of the SYNONYM controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SYNONYM controller to communicate with other entities through a communications network 713. Various communication protocols may be used by the SYNONYM controller as a subcarrier transport mechanism for interaction, such as, but not limited to: multicast, TCP/IP, UDP, unicast, and/or the like.

Information Server

An information server component 716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C(++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SYNONYM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SYNONYM database 719, operating systems, other program components, user interfaces, Web browsers, and/or the like.

Access to the SYNONYM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SYNONYM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SYNONYM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces.

Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the SYNONYM enabled nodes. The combined application may be nugatory on systems employing standard Web browsers.

Mail Server

A mail server component 721 is a stored program component that is executed by a CPU 703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C(++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SYNONYM.

Access to the SYNONYM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 722 is a stored program component that is executed by a CPU 703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 720 is a stored program component that is executed by a CPU 703, cryptographic processor 726, cryptographic processor interface 727, cryptographic processor device 728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SYNONYM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SYNONYM component to engage in secure transactions if so desired. The cryptographic component facilitates the secure accessing of resources on the SYNONYM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SYNONYM Database

The SYNONYM database component 719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SYNONYM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the SYNONYM database is implemented as a data-structure, the use of the SYNONYM database 719 may be integrated into another component such as the SYNONYM component 735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 719 includes several tables 719a-g. A user table 719a includes fields such as, but not limited to: customer ID, CIF number, name, an address, and/or the like. The user table may support and/or track multiple entity accounts on a SYNONYM. An account table 719b includes fields such as, but not limited to: account number, account type, account opening date, asset ID, asset value, and/or the like. A deposit table 719c includes fields such as, but not limited to: deposit number, deposit type, deposit date, and/or the like. An anonymization table 719d includes fields such as, but not limited to: anonymization db name, anonymization db id, anonymization db table, anonymization db field, and/or the like. A synthesization table 719e includes fields such as, but not limited to: synthesization db name, synthesization db id, synthesization db table, synthesization db field, and/or the like. A transactions table 719f includes fields such as, but not limited to, transaction id, transaction account one, transaction account two, transaction type, transaction amount, and/or the like. An anonymization replacement data table 719g includes fields such as, but not limited to, replacement first name, replacement last name, replacement address, and/or the like.

In one embodiment, the SYNONYM database may interact with other database systems. For example, employing a distributed database system, queries and data access by search SYNONYM component may treat the combination of the SYNONYM database, an integrated data security layer database as a single database entity.

In one embodiment, user programs may contain various user interface primitives, which may serve to update the SYNONYM. Also, various accounts may require custom database tables depending upon the environments and the types of clients the SYNONYM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 719a-g. The SYNONYM may be configured to keep track of various settings, inputs, and parameters via database controllers.

The SYNONYM database may communicate to and/or with other components in a component collection, including itself, and/or facilities of the like. Most frequently, the SYNONYM database communicates with the SYNONYM component, other program components, and/or the like. The database may contain, retain, and provide information regarding other nodes and data.

The SYNONYMs

The SYNONYM component 735 is a stored program component that is executed by a CPU. In one embodiment, the SYNONYM component incorporates any and/or all combinations of the aspects of the SYNONYM that was discussed in the previous figures. As such, the SYNONYM affects accessing, obtaining and the provision of testing, information, services, transactions, and/or the like across various communications networks.

The SYNONYM component enables the anonymization, synthesization, testing of production environments, and/or the like and use of the SYNONYM.

The SYNONYM component enabling access of information between nodes may be developed by employing standard development tools and languages such as, but not limited to: Apache components, Assembly, ActiveX, binary executables, (ANSI) (Objective-) C(++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SYNONYM server employs a cryptographic server to encrypt and decrypt communications. The SYNONYM component may communicate to and/or with other components in a component collection, including itself, and/or facilities of the like. Most frequently, the SYNONYM component communicates with the SYNONYM database, operating systems, other program components, and/or the like. The SYNONYM may contain, communicate, generate, obtain, and/or provide program component, system, user, and/or data communications, requests, and/or responses.

Distributed SYNONYMs

The structure and/or operation of any of the SYNONYM node controller components may be combined, consolidated, and/or distributed in any number of ways to facilitate virtual development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SYNONYM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http://                                  Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. An environment deployment processor-implemented method, comprising:
    receiving a request, using a processor, to create a deployment environment;
    identifying real data records, using the processor, based on the request;
    generating synthesized data from the real data using the processor;
    generating a synthetic deployment environment, using the processor, wherein generation further includes:
        instantiating user accounts,
        populating the synthetic deployment environment with a profile of deployment components,
        loading the synthesized data into the synthetic deployment environment;
    and
    deploying the synthetic deployment environment, using the processor, to a location specified in the request.

2. The method of claim 1, wherein the deployment environment is used to create a virtual bank.

3. The method of claim 1, wherein the deployment environment is used for generating synthetic gaming deployment environments.

4. The method of claim 1, wherein the deployment environment is used for generating synthetic simulation deployment environments.

5. The method of claim 1, wherein the deployment environment is used for generating synthetic educational deployment environments.

6. The method of claim 1, wherein the deployment environment is used for generating synthetic medical deployment environments.

7. The method of claim 1, wherein the deployment environment is used for quality improvement.

8. An environment deployment apparatus, comprising:
    a memory;
    a processor disposed in communication with said memory, and configured to issue a plurality of processing instructions stored in the memory, wherein the processor issues instructions to:
        receive a request to create a deployment environment;
        identify real data records based on the request;
        generate synthesized data from the real data;
        generate a synthetic deployment environment, wherein generation further includes instructions to:
            instantiate user accounts, populate the synthetic deployment environment with a profile of deployment components,
            load the synthesized data into the synthetic deployment environment; and
        deploy the synthetic deployment environment to a location specified in the request.

9. An environment deployment processor-readable non-transitory medium storing processor-issuable instructions to:
    receive a request to create a deployment environment;
    identify real data records based on the request;
    generate synthesized data from the real data;
    generate a synthetic deployment environment, wherein generation further includes instructions to:
        instantiate user accounts,
        populate the synthetic deployment environment with a profile of deployment components,
        load the synthesized data into the synthetic deployment environment; and
        deploy the synthetic deployment environment to a location specified in the request.

* * * * *